United States Patent [19]

DeGood et al.

[11] 4,164,998

[45] Aug. 21, 1979

[54] ACCUMULATION LIVE ROLLER CONVEYOR

[75] Inventors: David A. DeGood, 3174 Hudson, Hudsonville, Mich. 49426; David K. Stevens, Jenison, Mich.

[73] Assignee: David A. DeGood, Hudsonville, Mich.

[21] Appl. No.: 768,980

[22] Filed: Feb. 16, 1977

[51] Int. Cl.² ............................................. B65G 13/06
[52] U.S. Cl. ...................................... 198/781; 198/790
[58] Field of Search ............... 198/781, 789, 790, 783, 198/788, 780, 787; 74/221

[56] References Cited

U.S. PATENT DOCUMENTS

| | | | |
|---|---|---|---|
| 2,129,510 | 9/1938 | Taylor | 198/787 |
| 3,612,248 | 10/1971 | Wallis | 198/781 |
| 3,616,894 | 11/1971 | Koennecke et al. | 198/781 |
| 3,643,788 | 2/1972 | Werntz | 198/781 |

FOREIGN PATENT DOCUMENTS 1178094  1/1970  United Kingdom ..................... 198/781

Primary Examiner—Robert B. Reeves
Assistant Examiner—Douglas D. Watts
Attorney, Agent, or Firm—Ian C. McLeod

[57] ABSTRACT

A live roller conveyor is described of the type which can accumulate conveyed articles on a pass line. Article accumulation is usually automatically achieved on the pass line by disconnecting pre-selected rollers from a power source. The power source for a driven roller includes a drive wheel moveably mounted on the frame supporting the rollers and having a radial drive surface which is rotatably mounted on a shaft having its longitudinal axis spaced from the longitudinal axis of the roller such that the drive surface can be moved into frictional engagement with an end surface of a roller to rotate the roller. The drive surface on the drive wheel is preferably in the form of a tensioned belt which extends around a portion of the circumference of the drive wheel and around a spaced apart rotatable drive shaft for rotation of the drive wheel.

17 Claims, 6 Drawing Figures

ACCUMULATION LIVE ROLLER CONVEYOR

DESCRIPTION OF THE INVENTION

The present invention relates to a live or powered roller conveyor which permits accumulation of conveyed articles by stopping them on a pass line. In particular, the present invention relates to a power source for the rollers which utilizes the frictional engagement of a powered rotatable drive surface on a drive wheel which is moved into contact with an end of a roller.

PRIOR ART

Live roller accumulation conveyors are well known to the prior art. The present invention is concerned with conveyors which are constructed such that the power source can be disconnected from the rollers as articles accumulate on the pass line so that the articles do not press against each other or what is termed in the art "zero pressure" accumulation. One mechanism which disconnects the rollers is a trigger or sensor on the pass line which when depressed by an article moves a mechanical linkage which disconnects the power source from the rollers. Usually the linkage is a mechanical rod or arm which is moved by the passage of the article over the pass line trigger; however, sometimes air pressure bellows or solenoids or other motive means are activated by the trigger to move the linkage.

U.S. Pat. Nos. 3,012,652 (Poel), 3,643,788 (Werntz) and 3,810,538 (Moyes) disclose such prior art devices. Each of these patents show a conveyor where one or more of the rollers is moved by selectively frictionally contacting the rollers with a rotating frictional drive belt provided under the pass line (U.S. Pat. No. 3,012,652 and U.S. Pat. No. 3,643,788) or by selectively contacting the frictional drive belt with a rotating power means (U.S. Pat. No. 3,810,538). These devices operate reliably but are relatively complicated and expensive to construct. Also they have pinch points which may not be covered which can cause safety problems.

OBJECTS

It is therefore an object of the present invention to provide a live roller conveyor which is simple and inexpensive to construct. It is further an object of the present invention to provide a simplified means for powering the conveyor by means of a frictional drive surface in contact with the rollers which also very rapidly responds to the application of the power. Further still, it is an object of the present invention to provide a conveyor which has the possible pinch points well shielded. These and other objects will become apparent by reference to the following description and to the drawings.

IN THE DRAWINGS

DESCRIPTION OF THE INVENTION

Figure 1:
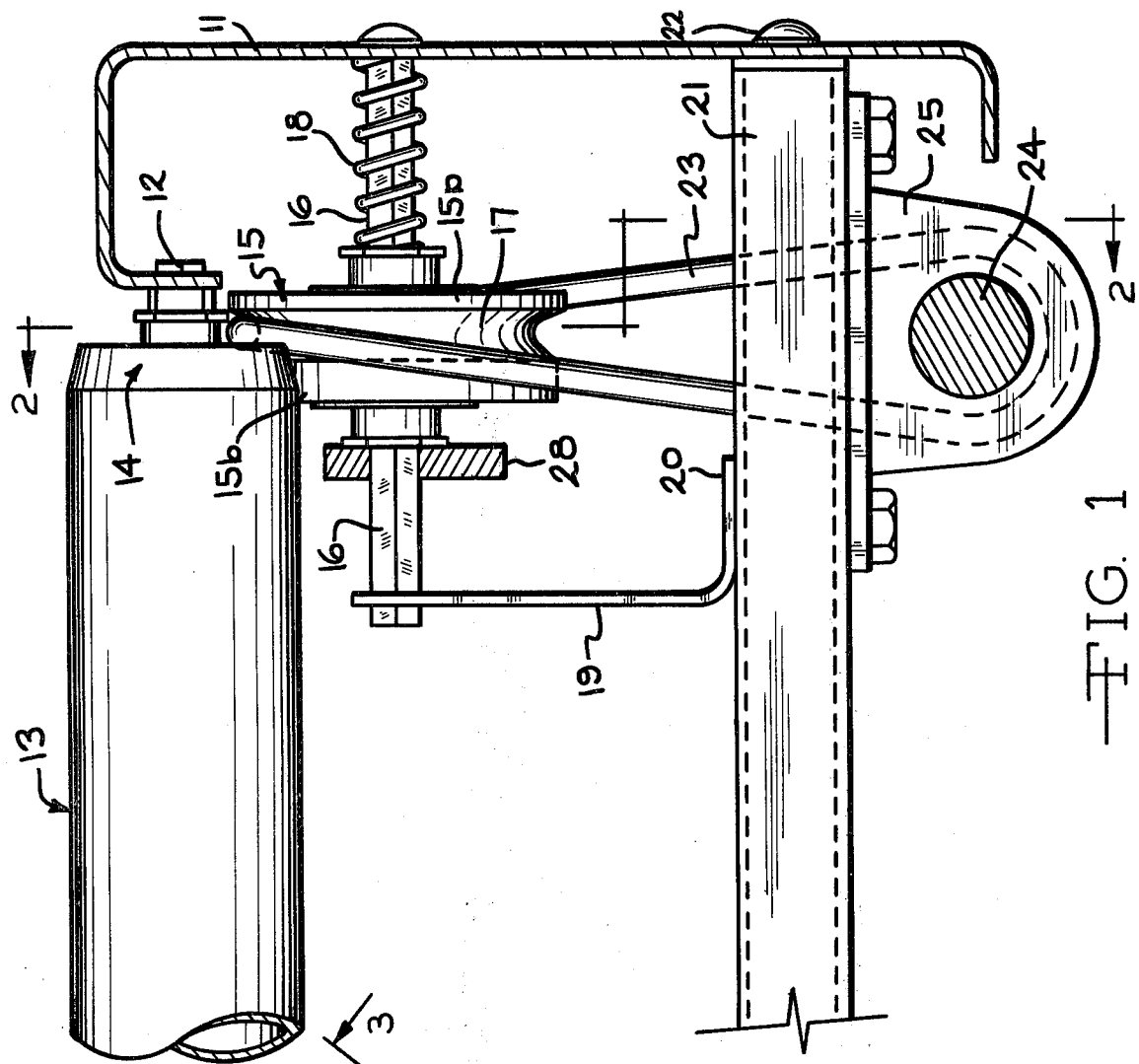
FIG. 1 is a front view of a partial cross-section across the frame rail of a half section of a preferred conveyor in a powered roller position illustrating a belt as a drive surface mounted on a linearly slideable and rotatable drive wheel to frictionally engage a tapered end surface of a roller.

The present invention relates to the improvement in a live roller conveyor apparatus including a frame, a plurality of live rollers mounted on longitudinal axes at both ends on the frame in spaced relation and defining a pass line along which articles supported on the rollers are transported which comprises a surface at one end of a plurality of the rollers which provide powered transport of the articles on the pass line; a shaft having its longitudinal axis spaced from the axis of each roller with the end surface to be powered; a drive wheel rotatably mounted on the shaft with a radial frictional drive surface such that it can engage the end surface of the roller and disengage therefrom; means for rotating the drive wheel; and means for selectively moving the drive wheel and thus the drive surface into and out of engagement with the end surface of the roller.

The present invention particularly relates to a live roller conveyor apparatus comprising: a frame, a plurality of rollers mounted on longitudinal axes at both ends on the frame in spaced relation so as to define a pass line for powered transport of articles by the rollers at least some of which have a tapered surface at one end which is concentric with its roller longitudinal axis; a fixed shaft mounted on said frame adjacent each powered roller having its longitudinal axis parallel to and below the axis of a roller with the tapered end; a drive wheel with a circumferential double rimmed groove mounted adjacent the tapered surface of the roller such that an inner rim is closely spaced from the rollers and an outer rim is larger in diameter than the inner rim and rotatably mounted on the fixed shaft such that it is slideable on the longitudinal axis of the fixed shaft; an endless resilient belt which fits into the groove such that a surface of the belt is moveable into contact with the tapered surface of the roller when the wheel is slid on the shaft; a rotatable drive shaft provided with power means for rotation mounted along the pass line and in tensioned engagement with the belt; and an assembly for moving the drive belt surface into and out of contact with the tapered surface of the roller by sliding the drive wheel on the fixed shaft including a trigger mounted on the pass line which activates a powered linkage which moves the drive wheel.

A particularly preferred embodiment of the present invention comprises a frame, a plurality of rollers on longitudinal axes at both ends on the frame in spaced relation so as to define a pass line for powered transport of articles by the rollers at least some of which have a tapered surface at one end which is concentric with its roller longitudinal axis; a pivot arm mounted on the frame adjacent each powered roller below the axis of the roller; a drive wheel with a circumferential double rimmed groove mounted adjacent the taper surface of a roller on the pivot arm such that it has an inner rim which is closely spaced from the roller and an outer rim larger in diameter than the inner rim; an endless resilient belt which fits into the groove such that a surface of the belt is moveable into contact with the tapered surface of the roller when the arm is pivoted towards the roller without slipping out of the groove; a rotatable drive shaft provided with power means for rotation mounted along the pass line and in tensioned engagement with the belts; and an assembly for moving the drive belt surface into and out of contact with the tapered surface of the roller by pivoting the arm including a trigger mounted on the pass line which activates a powered linkage which moves the wheel.

In the preferred conveyor, the means rotating the drive wheel is a resilient belt which is mounted as a pulley on the drive wheel and separately powered by frictional engagement with a drive means which tensions the belt on the drive wheel. As will be seen from the following description, an important element of the present invention is a radial frictional drive surface on the drive wheel which can be powered by any number of conventional means. An important feature of the present invention is the moveable drive wheel with its frictional drive surface which engages and disengages the surface at the end of the roller which provides a compact, safe and inexpensive live roller conveyor.

SPECIFIC DESCRIPTION

Figure 2:
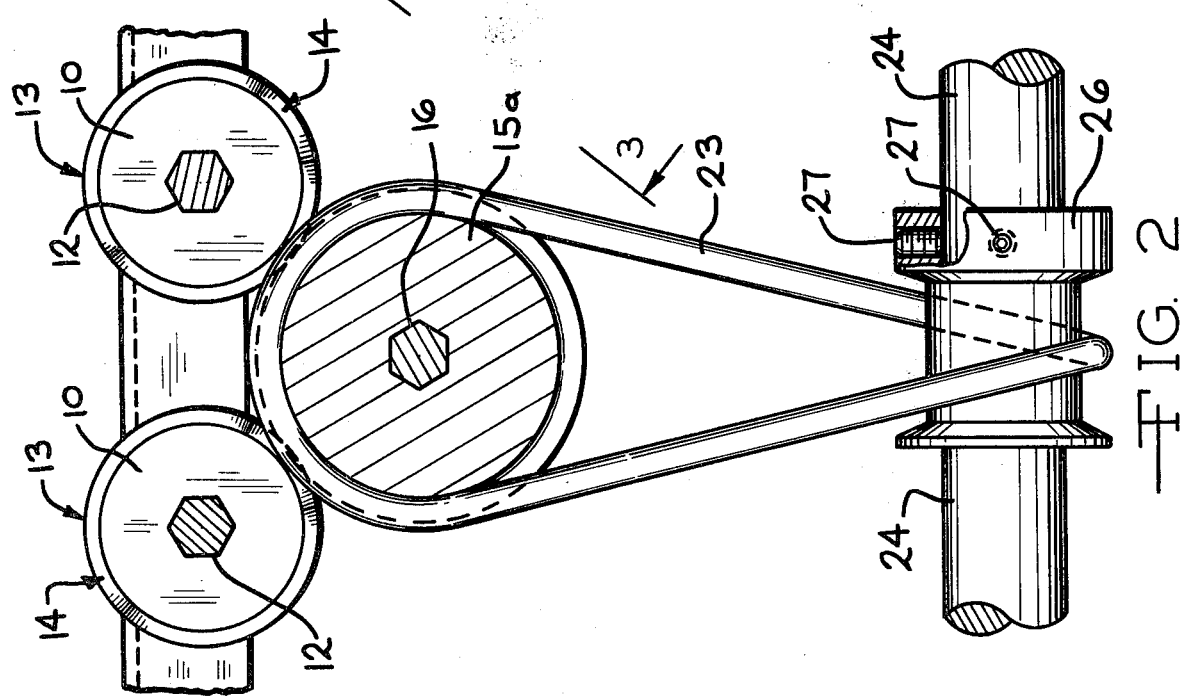
FIG. 2 is an end view along line 2—2 of FIG. 1 of a cross-section through a pair of spaced apart adjacent rollers illustrating the belt in engagement with a portion of the tapered surfaces of two rollers.
Figure 3:
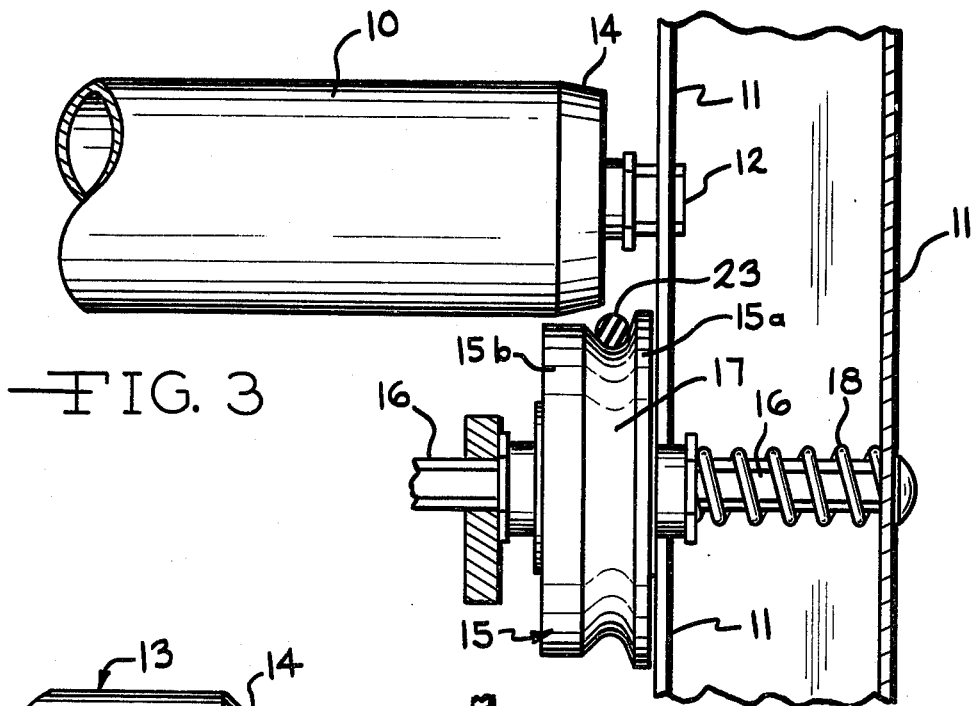
FIG. 3 is a front oblique upward view along line 3—3 of FIG. 2, particularly illustrating the belt disengaged from the tapered surface of one roller.

In FIGS. 1 to 3, live rollers 10 are shown which form a part of a pass line on a conveyor with other rollers. The rollers 10 are mounted rotatably on their longitudinal axes in a channeled frame 11 by means of hexagonal shafts 12 attached to the frame 11 and to the rollers 10 by means of conventional internal roller bearings (not shown). The rollers 10 together define an article carrying surface 13. A tapered surface 14 is provided at one end of the roller(s) 10 to be powered. As can be seen from FIG. 2, two spaced apart adjacent rollers 10 have tapered surfaces 14 and are powered.

Attached to the frame 11 and between and below the adjacent rollers 10 is provided a drive wheel 15 having a large outer rim 15a and a smaller inner rim 15b defining a circumferential groove 17. The drive wheel 15 is rotatably mounted on its radial axis on a hexagonally cross-sectioned fixed shaft 16 by means of conventional roller bearings (not shown) in the drive wheel 15. The drive wheel 15 is linearly slideable along the longitudinal axis of the fixed shaft 16 in order to move tangentially into a closely spaced relationship with the tapered surface 14. In this embodiment of the invention, the longitudinal axis of the fixed shaft 16 is fixed parallel to the longitudinal axis of the rollers 10.

In the preferred form, a compressed coil spring 18 or other resilient means is provided which urges the drive wheel 15 towards the tapered surface 14 around the shaft 16. A mechanical linkage adjacent the drive wheel 15 in the form of an arm or lever 28 or the like, actuated by a trigger (not shown) and mounted on the pass line, usually moved by a power source (not shown), slides the drive wheel 15 away from the tapered surface 14 against the spring 18. A L shaped member 19 mounts the end of the fixed shaft 16 which is away from the frame 11 and is attached at its base 20 (FIG. 2) to a cross member or bar 21 which is attached across the frame 11 in spaced parallel relationship to the rollers 10 by means of a rivet 22.

A resilient high friction rubber belt 23 is mounted in the groove 17 of the drive wheel 15 such that a small circular segment of the belt 23 frictionally engages the tapered surface 14 when the drive wheel 15 is in its most extended position due to the tension of the spring 18. The outer rim 15a of the wheel 15 must be large enough in diameter so that the belt 23 does not slip out of the groove 17 because of the lateral force exerted by taper 14 on the roller 10 on the belt 23. The inner rim 15b is designed to be in closely spaced relation beneath the roller 10. As can be seen from FIG. 3, the belt 23 is moved away from and disengages the tapered surface 14 when the arm 28 slides the wheel 15 on the shaft 16 to compress the spring 18.

Spaced apart from the drive wheel 15 is a rotatable drive shaft 24 which is mounted along the roller 10 pass line. The shaft 24 rotates in journals 25 mounted on the underside of the cross members 21 (FIG. 2). Spools or bushings 26 are mounted on the drive shaft 24 and are fixed in position by allen nuts 27 (FIG. 2) or the like. The belt 23 is tensioned on the bushing 26 so that it is in turn tensioned on the drive wheel 15 in the groove 17. The drive shaft 24 is powered by a motor or other motive means (not shown).

In operation, the drive shaft 24 is rotated thus frictionally driving the belt 23 on the bushing 26. The belt 23 frictionally engages the groove 17 and rotates the drive wheel 15. When the belt 23 is engaged with the tapered surface 14 of the adjacent rollers 10 it also rotates these rollers 10 (see FIG. 2). The spring 18 tensions the drive wheel 15 into the roller 10 driving position. When the arm 28 is moved against the drive wheel 15, the wheel 15 is linearly slid on the shaft 16 to compress the spring 18 and to disengage the belt 23 from the tapered surface 14. Usually a very small movement along the shaft 16 of between about 3/16 and ½ inch (0.48 and 1.27 cm) is sufficient to provide complete disengagement of the belt 23 from the end 14 of the roller 10 and thus the disengagement is very rapid and positive by comparison with prior art conveyors.

Figure 4:
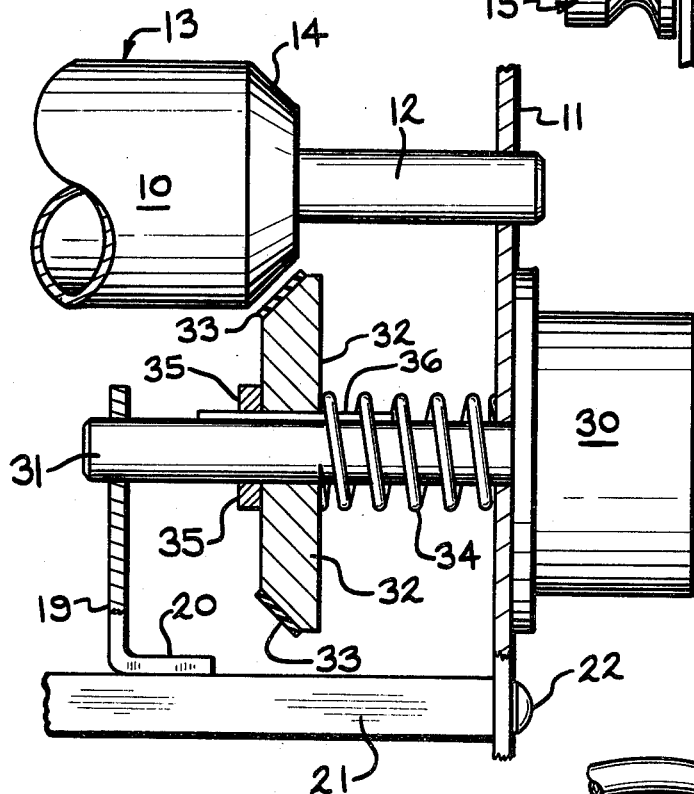
FIG. 4 is a schematic front view of an alternate form of the conveyor wherein the drive wheel is directly rotated by a motor which can also serve as a brake and slides on a shaft to engage the tapered surface of a roller.

FIG. 4 illustrates a variation of the conveyor of FIGS. 1 to 3. A roller 10, frame 11, roller shaft 12, carrying surface 13, tapered surface 14, with L shaped member 19 including base 20 attached to cross member 21 is provided. A motor 30 is provided with a shaft 31 which is rotatably journaled at its end opposite the motor by L shaped member 19. The shaft 31 is mounted below and parallel to the roller shaft 12. A drive wheel 32 is slideably mounted on the shaft 31. A circular drive surface 33 is mounted on the drive wheel 32 and is made of a high coefficient of friction material such as rubber. The surface 33 is positioned on the wheel 32 at an angle to the axis of the shaft 31 which corresponds to the angle of the tapered surface 14. A coil spring 34 is mounted around the shaft 31 such that the drive wheel 32 is urged towards the roller 10. A lever or arm 35 is used to linearly move the drive wheel 32 and surface 33 on the wheel 32 away from the tapered surface 14 of the roller 10 thus compressing spring 34. A key 36 is provided in the shaft 31 so that the drive wheel 32 will linearly slide on shaft 31. As shown in FIG. 4 the surface 33 is disengaged from the tapered surface 14 of the roller 10.

In operation of the conveyor in FIG. 4, the motor 30 can be continuously operated or intermittently operated only when the surfaces 14 and 33 are engaged. The lever 35 moves along the shaft 31 towards the motor 30 to move the wheel 32 away from the tapered surface 14.

Figure 5:
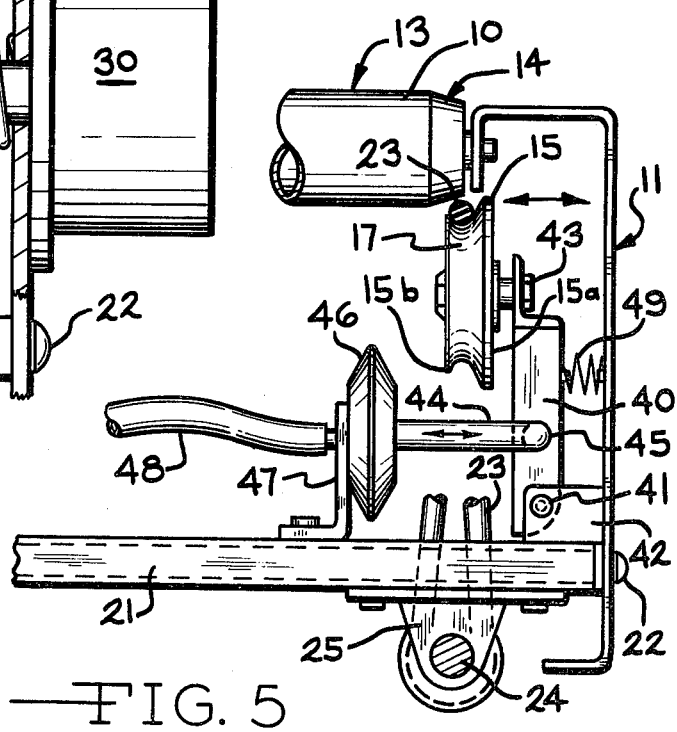
FIG. 5 is a front view of a partial cross-section across the frame rail of a half section of a preferred conveyor illustrating the use of a pivot arm mounted on the frame to move the drive wheel and belt into contact with the end of the roller.

FIG. 5 shows a particularly preferred embodiment of the powered drive roller conveyor of the present invention. The rollers 10 are mounted on the frame 11 as in the previously described conveyors with the drive shaft 24 provided under the rollers 10. A pivot arm 40 is mounted on the frame 11 by means of pivot pin 41 inserted through spaced apart plates 42 such that the pivot arm 40 can rock towards and away from the tapered surface 14. The drive wheel 15 is rotatably mounted on a shaft 43 fixed to the pivot arm 40. The drive belt 23 is mounted in the groove 17 in the drive wheel 15. The drive wheel 15 is provided with the outer rim 15a which is larger in diameter than the inner rim 15b as described in reference to FIGS. 1 to 3. The pivot arm 40 is moved by a linkage or arm 44 moveably attached to the pivot arm 40 by pin 45. The linkage 44 is powered by air bellows 46 mounted on the cross bar 21 by bracket 47 and air line 48 is attached to the bellows 46. The bellows 46 has a diaphragm (not shown) which is moved by applying air pressure to move the linkage 44 and thus the pivot arm 40. It can also be operated on the other side of the diaphragm by means of a vacuum. A spring 49 is mounted between the frame 11 and pivot arm 40 to urge the drive wheel 15 and belt 23 towards the tapered surface 14 of the roller 10.

In operation, the spring 49 urges the belt 23 into contact with the tapered surface 14 to power the roller 10. When an article (not shown) moves on the pass line downstream from the roller 10 a trigger bar not shown is depressed which opens a valve and supplies air pressure to the bellows 46. The linkage 44 moves the pivot arm 40 outward toward the frame 11 and disconnects the belt 23 from frictional engagement with the tapered surface 14. If the article merely passes over the trigger bar, the belt 23 rapidly re-engages the tapered surface 14 and if the article is halted on the pass line, then the belt 23 remains disengaged from the surface 14.

Figure 6:
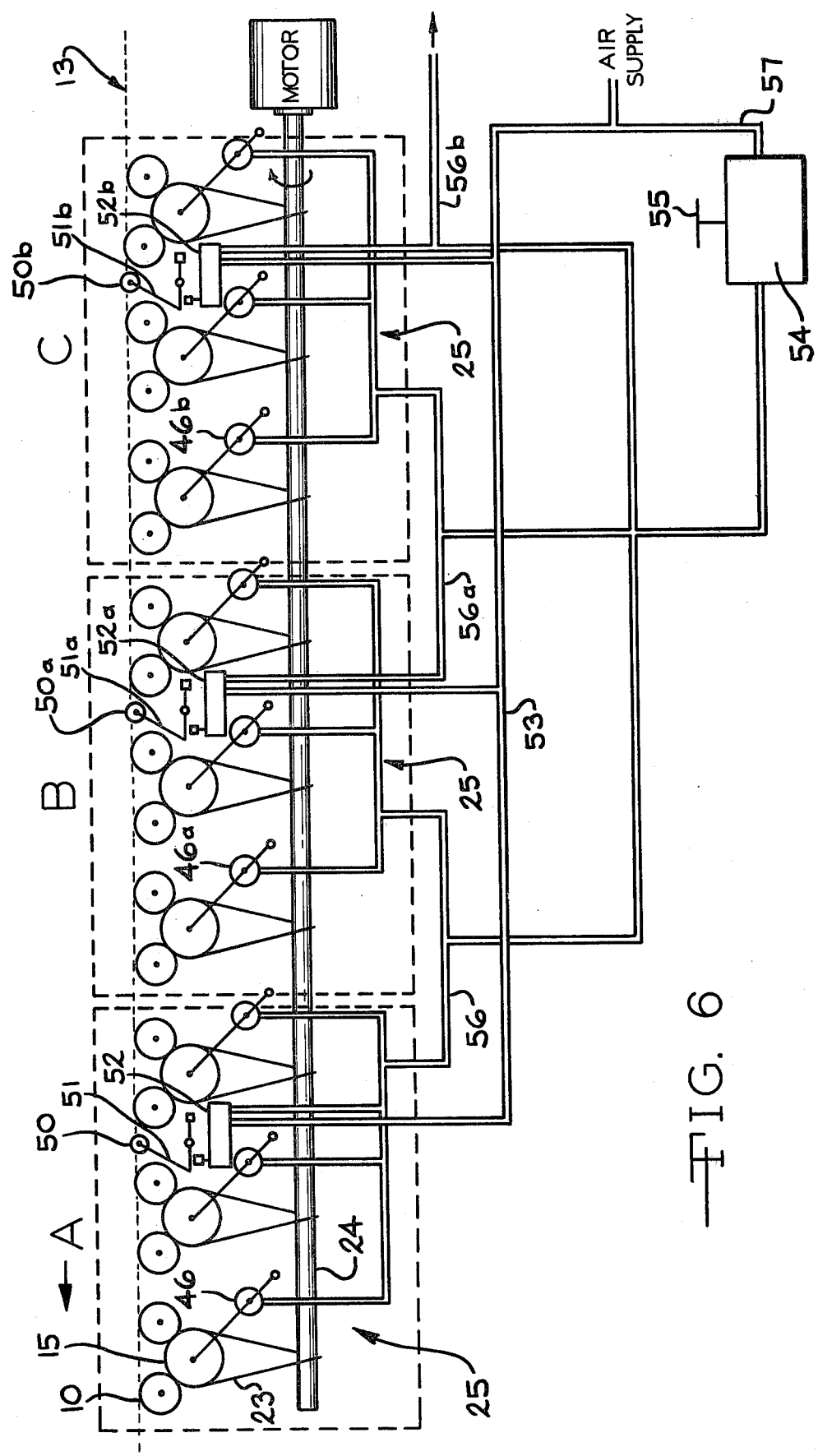
FIG. 6 is a schematic front view of a pass line with live rollers particularly illustrating the use of air pressure or a vacuum powered bellows for moving a linkage which disconnects the drive wheels and belts from the ends of the rollers as articles accumulate on the pass line.

FIG. 6 shows a schematic front view of a pass line with pairs of rollers driven by drive wheels 15 and belts 23 powered by the shaft 24 which is powered for rotation by a motor. The rollers 10 are shown grouped in sets of three designated as A, B and C and boxed in by dotted lines. Between the rollers 10 in each group A, B and C is provided a trigger bar 50, 50a and 50b extending above the carrying surface 13 and across the pass line so as to be depressible by an article (not shown). The bars 50, 50a and 50b engage valve pins 51, 51a and 51b extending from valves 52, 52a and 52b respectively which are closed when the bars 50, 50a and 50b extend above the carrying surface 13. The valves 52, 52a and 52b are connected on their upstream side with an air line 53. The air line 53 downstream of valve 52 is connected by line 56 to the air bellows 46 for moving the drive wheels 15 in Group B. The downstream side of valve 52a is connected by a line 56a to bellows 46a for moving the drive wheels 15 in Group C and so on down the pass line. A valve 54 and manually or automatically operated pin 55 which is in the closed position when the pin 55 is extended is provided in an extension 57 from the air supply line with a line 58 leading to lines 56, 56a and 56b.

In operation, the article depresses the trigger 50 which disengages the rollers 10 in Groups A and B. As long as the trigger 50 is depressed, the rollers 10 in Groups A and B remain disengaged. If an article depresses trigger 50a, then the Group C rollers 10 are disengaged and so on up the line as articles accumulate. If the article is removed from the rollers 10 in Group A, then the rollers 10 in Groups A and B are activated to then move an article to Group A and so on up the line. The result is a true zero pressure accumulation of articles on the pass line in Groups A, B and C. By depressing pin 55 in valve 54 all of the rollers 10 in Groups A, B and C can be disengaged simultaneously by supplying air through line 58 to lines 56, 56a and 56b thus bypassing valves 52, 52a and 52b.

As will be appreciated, there are numerous mechanisms for rotating the drive wheel including drive belts and gears in contact with the drive wheel. Also it will be appreciated that a Bendix type drive on a motor such as 30 in FIG. 4 could be used to extend the drive wheel against the roller end surface. Further the roller end can have any configuration but is preferably tapered as shown in FIGS. 1 to 5 so long as the friction drive surface can contact the end of the roller. Preferably commercially available rollers 10 with rounded ends which provide a tapered surface are used. All of these variations will be obvious to those skilled in the art.

We claim:

1. In a live roller conveyor apparatus including a frame, a plurality of live rollers mounted on longitudinal axes at both ends on the frame in spaced relation and defining a pass line along which articles supported on the rollers are transported, the improvement which comprises:
    (a) a tapered surface at one end of each of a plurality of the rollers which provide powered transport of the articles on the pass line;
    (b) a plurality of shafts mounted on the frame each having its longitudinal axis spaced from and approximately parallel to the longitudinal axis of a roller with the end surface to be powered;
    (c) a drive wheel rotatably mounted on each shaft with a radial frictional drive surface, wherein the drive wheel has an inner rim which is closely spaced from the roller and an outer rim larger in diameter than the inner rim with the drive surface between the rims, the drive wheel being mounted on the shaft and the shaft on the frame such that the drive surface can engage the tapered end surface of the roller from which the shaft is spaced to provide power and disengage therefrom;
    (d) means for rotating the drive wheel; and
    (e) means for selectively moving the drive wheel and thus the drive surface into and out of engagement with the end surface of the roller.

2. The conveyor apparatus of claim 1 wherein the shaft is mounted on the frame below and between two adjacent rollers which both have an end surface which is engageable by the drive surface.

3. The conveyor apparatus of claim 1 wherein the drive surface is a high friction material mounted on the drive wheel.

4. The conveyor apparatus of claim 3 wherein the high friction material is in the form of a belt in a groove in the drive wheel and attached in tension to a powered rotatable drive shaft spaced from the shaft for the drive wheel, as the means for rotating the drive wheel.

5. The conveyor apparatus of claim 4 wherein the powered drive shaft extends along and under the pass line to provide power for multiple belts.

6. The conveyor apparatus of claim 1 wherein resilient means is provided so as to move the drive surface of the drive wheel into contact with the end surface of the roller and wherein a linkage activated by a trigger on the pass line disengages the drive wheel from the end surface by moving the drive wheel in opposition to the movement by the resilient means.

7. The conveyor apparatus of claim 6 wherein the resilient means is a coil spring mounted around the longitudinal axis of the shaft mounting the drive wheel and wherein the drive wheel is slideable on its longitudinal axis on the shaft which is mounted parallel to the axis of a roller such that the spring urges the drive wheel into contact with the roller end surface.

8. The conveyor apparatus of claim 1 wherein the drive wheel and shaft are mounted on an arm which pivots on the frame and wherein a resilient means is provided between the frame and the pivot arm such that the drive wheel is urged into contact with an end of a roller.

9. A live roller conveyor apparatus comprising:
 (a) a frame;
 (b) a plurality of rollers mounted on longitudinal axes at both ends on the frame is spaced relation so as to define a pass line for powered transport of articles by the rollers at least some of which have a tapered surface at one end which is concentric with the roller longitudinal axis;
 (c) a fixed shaft mounted on said frame adjacent each powered roller having its longitudinal axis parallel to and below the axis of a roller with the tapered end;
 (d) a drive wheel with a circumferential double rimmed groove mounted adjacent the tapered surface of the roller such that it has an inner rim which is closely spaced from the roller and an outer rim larger in diameter than the inner rim and rotatably mounted on the fixed shaft such that it is slideable on the longitudinal axis of the fixed shaft;
 (e) an endless resilient belt which fits into the drive wheel groove such that a surface of the belt is moveable into contact with the tapered surface of the roller when the wheel is slid on the fixed shaft towards the roller without slipping out of the groove;
 (f) a rotatable drive shaft provided with power means for rotation mounted along the pass line and in tensioned engagement with the belt; and
 (g) an assembly for moving the drive belt surface into and out of contact with the tapered surface of the roller by sliding the drive wheel on the fixed shaft including a trigger mounted on the pass line which activates means which moves the drive wheel.

10. The apparatus of claim 9 wherein the fixed shaft and drive wheel are mounted below and between two rollers both of which have tapered surfaces which are driven by one belt.

11. The apparatus of claim 9 wherein the means is an air or vacuum activated bellows which moves an arm in contact with the drive wheel.

12. A live roller conveyor apparatus which comprises:
 (a) a frame;
 (b) a plurality of rollers mounted on longitudinal axes at both ends on the frame in spaced relation so as to define a pass line for powered transport of articles by the rollers at least some of which have a tapered surface at one end which is concentric with its roller longitudinal axis;
 (c) a pivot arm mounted on the frame adjacent each powered roller below the axis of the roller;
 (d) a drive wheel with a circumferential double rimmed groove mounted adjacent the tapered surface of a roller on the pivot arm such that it has an inner rim which is closely spaced from the roller and an outer rim larger in diameter than the inner rim;
 (e) an endless resilient belt which fits into the groove such that a surface of the belt is moveable into contact with the tapered surface of the roller when the arm is pivoted towards the roller without slipping out of the groove;
 (f) a rotatable drive shaft provided with power means for rotation mounted along the pass line and in tensioned engagement with the belts; and
 (g) an assembly for moving the drive belt surface into and out of contact with the tapered surface of the roller by pivoting the arm including a trigger mounted on the pass line which activates a powered linkage which moves the wheel.

13. The apparatus of claim 12 wherein the shaft and drive wheel are mounted below and between two rollers both of which have tapered surfaces which are driven by one belt.

14. The apparatus of claim 12 wherein the powered linkage is moved by an air or vacuum actuated bellows.

15. The apparatus of claim 12 wherein the belt is circular in cross-section.

16. The apparatus of claim 12 wherein a bushing for mounting the belt is provided on the drive shaft.

17. The apparatus of claim 12 wherein resilient means provided between the frame and the pivot arm tensions the drive wheel and thus the belt surface into contact with the tapered surface of the roller.

* * * * *